(12) United States Patent
Pronske et al.

(10) Patent No.: US 7,827,794 B1
(45) Date of Patent: Nov. 9, 2010

(54) ULTRA LOW EMISSIONS FAST STARTING POWER PLANT

(75) Inventors: Keith L. Pronske, Wilton, CA (US);
Fermin Viteri, Sacramento, CA (US);
Scott MacAdam, El Dorado Hills, CA (US); Lawrence C. Hoffman, Citrus Heights, CA (US)

(73) Assignee: Clean Energy Systems, Inc., Rancho Cordova, CA (US)

( * ) Notice: Subject to any disclaimer, the term of this patent is extended or adjusted under 35 U.S.C. 154(b) by 755 days.

(21) Appl. No.: 11/594,331

(22) Filed: Nov. 7, 2006

Related U.S. Application Data

(60) Provisional application No. 60/759,139, filed on Jan. 13, 2006, provisional application No. 60/733,638, filed on Nov. 4, 2005.

(51) Int. Cl.
*F02G 3/00* (2006.01)
*F02C 3/00* (2006.01)

(52) U.S. Cl. .................. 60/728; 60/39.5; 60/39.53; 60/722; 60/726; 60/730; 60/805; 60/806

(58) Field of Classification Search ............ 429/12; 60/645, 728
See application file for complete search history.

(56) References Cited

U.S. PATENT DOCUMENTS 4,731,102 A * 3/1988 Yoshino ................ 62/654
5,593,274 A * 1/1997 Carreno et al. ............. 415/115
5,956,937 A * 9/1999 Beichel ..................... 60/39.17
6,276,170 B1 * 8/2001 Ha ................................ 62/646
6,537,514 B1 * 3/2003 Prasad et al. ............. 423/437.1

FOREIGN PATENT DOCUMENTS

WO    WO 99/40304 A1 * 8/1999

* cited by examiner

*Primary Examiner*—Jerry Lorengo
*Assistant Examiner*—Jared Wood
(74) *Attorney, Agent, or Firm*—Heisler & Associates

(57) ABSTRACT

The power plant combusts a hydrocarbon fuel with oxygen to produce high temperature high pressure products of combustion. These products of combustion are routed through an expander to generate power. The products of combustion are substantially free of oxides of nitrogen because the oxidizer is oxygen rather than air. To achieve fast starting, oxygen, fuel and water diluent are preferably stored in quantities sufficient to allow the power plant to operate from these stored consumables. The fuel can be a gaseous or liquid fuel. The oxygen is preferably stored as liquid and routed through a vaporizer before combustion in a gas generator along with the hydrocarbon fuel. In one embodiment, the vaporizer gasifies the oxygen by absorption of heat from air before the air is routed into a separate heat engine, such as a gas turbine. The gas turbine thus operates on cooled air and has its power output increased.

15 Claims, 2 Drawing Sheets

ULTRA LOW EMISSIONS FAST STARTING POWER PLANT

CROSS-REFERENCE TO RELATED APPLICATIONS

This application claims benefit under Title 35, United States Code §119(e) of U.S. Provisional Application No. 60/733,638 filed on Nov. 4, 2005 and U.S. Provisional Application No. 60/759,139 filed on Jan. 13, 2006.

FIELD OF THE INVENTION

The following invention relates to power generation systems which combust a hydrocarbon fuel with oxygen for low emissions power generation. More particularly, this invention relates to configurations of oxyfuel combustion power generation systems which can be quickly started and which are optimized for peak demand electric power generation by producing relatively high power output and potentially also enhancing power output from adjacent existing power generation systems.

BACKGROUND OF THE INVENTION

To maintain electric power distribution "grids" in proper working order, it is important that the supply of electric power into the grid be maintained a safe margin above the demand caused by users of electricity from the electric grid. Because demand fluctuates it is important for the supply to also fluctuate so that the grid can maintain a safe margin of oversupply without the waste associated with excessive oversupply.

Some sources of electric power are necessarily intermittent, making their availability for peak power demand unreliable. For instance, solar power is only available during clear daylight hours. Wind power is only available when the wind is blowing.

Furthermore, some sources of electric power have lower costs than others. When demand is relatively low, it is desirable to have electric power demand met as completely as possible with low cost sources. When demand is high, however, the cost associated with the source is less critical, with higher cost sources still being beneficial to meet the demand.

Unfortunately, many lower efficiency (higher cost) combustion based electric power sources that are suitable for reliable use upon peak power demand are also relatively large emitters of atmospheric pollution. For instance, older coal fired power plants, older steam power plants which combust non-coal hydrocarbon fuels and diesel generators are generally relatively high volume emitters of atmospheric pollution per unit of electricity generated; and especially emitters of oxides of nitrogen, oxides of sulfur, volatile organic compounds, particulates, and other pollutants.

In many regions the atmospheric emission of pollutants is strictly controlled. Hence, even though power plants may exist and be available to meet peak demand on the electric grid, the high emissions of such lower efficiency combustion based power plants make their utilization undesirable (or legally precluded).

Accordingly, a need exists for low or no pollution sources of electric power which can be activated relatively quickly to meet peak electric grid power demand. While such systems benefit additionally from the highest electric power generation efficiency possible, the need for high efficiency is less critical in such peak demand situations, such that this need can be met with lower efficiency technology, especially when accompanied by lower capital costs to implement such systems.

One prior art system that has met this need to some extent is known as Compressed Air Energy Storage (CAES) provided by the CAES Development Company L.L.C. of Houston, Tex. (web site http://www.caes.net). With this prior art technology compressed air is stored in suitable large underground caverns. Air compressors use electric grid power during low demand periods to compress the air in the cavern. When high demand periods occur, the compressed air is used to combust fuel and generate a drive gas for a power turbine. CAES systems are limited by the need to be near an appropriate geological formation and have no low pollution benefit and so need to comply with more difficult emissions requirements.

Furthermore, when peak demand periods are encountered, it is important that existing power plants be in operation and operate to produce their highest possible power output. Many such power plants operate as heat engines that are variants on the Carnot Cycle, such as Brayton cycle gas turbine power plants and combined cycle power plants. Such power plants produce more power when an inlet air temperature is lower. However, often peak electric power demand occurs when air temperatures are highest, due to air conditioner loads. Thus, when needed the most, these heat engine power plants often suffer from somewhat reduced power output.

It is known that power output of a gas turbine may be augmented by chilling the turbine inlet air through techniques such as evaporative or refrigerative cooling. For instance, in one study entitled "Advantages of Air Conditioning and Supercharging and LM6000 Gas Turbine Inlet" in the *Journal of Engineering for Gas Turbines and Power*, July 1995, Vol. 117, Page 513, by Kolp, D. A., Flye, W. M. and Guidotti, H. A. it is claimed that reducing the inlet air temperature of a typical 40 MW gas turbine from 80° F. to 40° F. will raise the power output from 34 MW to 41 MW. However, for a refrigeration system to cool the air to this degree would require a large portion of the power saved and increase capital expenses to build such a plant.

Accordingly, a need exists for low emissions power generation that can be quickly started without concern for the presence of wind or sunlight to meet peak electricity demand. A need also exists to reduce air inlet temperatures of heat engine power plants to maximize their power output at times of peak electricity demand which coincide with high ambient air temperatures.

SUMMARY OF THE INVENTION

With this invention a combustion power plant is provided which emits little or no regulated pollutants and which can be activated quickly, when peak electric demand calls for additional sources of electric power. In the basic power generation system, three inputs are provided for the system, including a fuel source, an oxygen source and a water source. The fuel source is preferably in the form of an on site tank maintaining the fuel at or near input pressures, or coupled to a delivery fuel pump. Alternatively, fuel and other consumables can be supplied from pipelines if available, or by mobile vehicle delivery. The fuel would most preferably be natural gas, with other possible fuels also being applicable including ethanol, diesel, hydrogen, syngas (a gas mixture of largely hydrogen and carbon monoxide) derived from coal gasification, or other sources including biomass sources, landfill gas, etc. If the fuel is in a liquid form it is preferably heated into a gaseous state before injection into the gas generator, with liquid injection also being possible. Such fuels are broadly defined as hydrocarbon fuels in that they are fuels containing hydrogen or carbon, typically both).

The oxidizer for the fuel is preferably substantially pure oxygen. This oxygen is preferably supplied within a tank on site with the tank preferably containing the oxygen in liquid form and with an appropriate heater to vaporize the oxygen into gaseous oxygen before induction into the gas generator (with an injection pump if needed) for combustion of the fuel. Because the oxidizer is oxygen rather than air, the production of oxides of nitrogen by the gas generator is substantially precluded. Rather, the hydrocarbon fuel combusts with the oxygen to form either substantially pure steam or a mixture of steam and carbon dioxide. These products of combustion can be vented to the atmosphere without violating emission requirements associated with oxides of nitrogen, particulates and carbon monoxide.

The fuel and oxygen are preferably supplied within tanks on site which have a supply sufficient to operate for a peaking period. This peaking period will be for various different amounts of time depending on the details of the electric grid. For instance, each of the tanks could have sufficient capacity to operate the plant for as little as one or two hours, or up to twenty-four hours or more. Longer duration operation could occur if refilling of the tanks occurs while the system is in operation.

Larger plants or larger duration operation are in many cases best supported by small on-site oxygen production facilities. Such systems can use grid power during low demand periods to generate oxygen. Then when high demand periods occur, the oxygen previously generated is combusted with the fuel to add power to the grid. Such systems are thus analogous to CAES systems except that they are non-polluting and no underground facility is needed.

A source of water is preferably provided to permit cooling of the fuel and oxygen during and after combustion, such that temperatures within the gas generator remain below maximum temperature thresholds for the gas generator. The source of water is preferably a tank of deionized water with a capacity sufficient to allow the gas generator to operate for the period discussed above.

The gas generator is a high pressure combustor of fuel and oxygen which preferably additionally includes water inlets for the deionized water where necessary to provide temperature control. One such gas generator suitable for this purpose is described in U.S. Pat. No. 5,709,077. The details of this gas generator are incorporated herein by reference.

The gas generator discharges a high temperature high pressure mixture of steam and carbon dioxide (or only steam in the case where the fuel is hydrogen). These products of combustion are delivered to a turbine where the products of combustion are expanded and reduced in temperature. The turbine is caused to spin and drive an electric power generator coupled thereto. This electricity is then delivered to the grid or otherwise beneficially used. The turbine can be a hot gas expander type, standard or modified industrial gas turbine or a high temperature steam turbine. The expander could also be reciprocating (i.e. a piston) or have any other form, and not necessarily be a turbine.

In at least one form of this invention, a turbine, such as an aero-derivative gas turbine, is utilized which was originally configured with an air compressor, a combustor, and multiple stages of turbines coupled to an electric power generator. Such a turbine assembly can be modified according to this invention with the removal of the air compressor which is no longer required. In one alternative embodiment, the shaft which had previously been used to drive the air compressor would instead be coupled to an auxiliary generator so that the main generator of the turbine assembly can still be utilized according to its regular design parameters. The auxiliary generator would be driven by the same shaft power previously required by the air compressor and would generate additional electric power for output from the turbine assembly. Hence, a greater amount of power would be obtained from the turbine assembly through the inclusion of the additional auxiliary generator and the removal of the air compressor, while the amount of combustion products passing through the turbine would remain the same.

The combustion products would then be discharged from the turbine and could then be vented to the atmosphere. These emissions would include steam and carbon dioxide primarily, such that little or no atmospheric impact would be encountered. Hence, regulatory approvals associated with siting and permitting such a plant might be simplified or eliminated altogether.

Various different enhancements to this basic power generation system could also be utilized if desired to enhance the performance of this system. If the turbine requires blade cooling or other cooling flows of a gaseous form to keep the turbine operating within design parameters, a source of compressed air could be utilized and directed to the appropriate pathways in the turbine to provide cooling for the turbine. These cooling pathways could initially be supplied with air with a transition over to steam once steam is available from outputs of the system, or supplied with the combustion products including steam and carbon dioxide once this mixture of steam and carbon dioxide is available. Such air for cooling would facilitate quick startup of the power generation system, such as to meet rapid increases in demand on an electric power grid, but would typically not be utilized other than during startup.

Another option for this power generation system is to retrofit the plant to be more suitable for base load use by recovering waste heat in the combustion products discharged from the turbine by passing them through a heat recovery steam generator ("HRSG"). Such an HRSG would function generally as a heat exchanger giving up heat to a separate stream, typically of steam, which would operate a Rankine cycle steam power plant and/or would generate steam for use in various different processes requiring heat and/or steam. The further cooled combustion products including steam and carbon dioxide could then be discharged to the atmosphere.

As another alternative, the steam and carbon dioxide combustion products discharged from the turbine could be directed to a condenser/separator, either after passing through an HRSG or after discharge from the turbine. Within the condenser, cooling water, cooling air or some other source of cooling would cool the combustion products to below a condensation temperature for the steam. Thus, the steam would condense to water within the condenser and gases remaining within the condenser would be primarily CO2.

The condensed water could then be discharged from the condenser and vented to the surrounding environment. Alternatively, this water could be routed to the deionized water source discussed above. If desired, a feed water heater could be utilized to preheat this water being recirculated from the condenser to the gas generator. Such a feed water heater could be heated with a diverted portion or all of the steam and CO2 after being discharged from the turbine, or elsewhere from the system where the steam and CO2 have sufficient heat to effectively heat the water being rerouted from the condenser back to the gas generator through the water supply.

Where such a condenser is provided, the CO2 could be collected such as for sequestration so that the CO2 would not be discharged to the surrounding atmosphere. The CO2 could also be stored for later use during startup as the cooling gas for the turbine blades or other systems which require cooling, especially during startup and before steam or steam and CO2 are available for cooling within the turbine.

Furthermore, peak power periods are typically in the summer months when demand for air conditioning is high. However, high ambient air temperatures limit the output of gas turbines, thus suppressing somewhat the supply of power at these times of high demand. In one form of this invention however, the vaporizer interposed between the liquid oxygen storage and the gas generator first utilizes ambient air to vaporize the oxygen through a heat exchanger within the vaporizer. This heat exchanger causes the air to be cooled. This thus cooled air is then routed into the compressor of the gas turbine or other air inlet of some other fuel/air combustion power generation system to enhance the efficiency of that second power generation system. As an alternative, a heat exchange fluid (i.e. brine or other low freezing point fluid) can be used to vaporize the oxygen and then the air can be cooled by heat transfer to the heat exchange fluid. Thus, not only is additional power produced through the expander downstream from the gas generator as described above, but also the power output from the second power generation system is enhanced, such that peak power demand is serendipitously met in two separate ways.

OBJECTS OF THE INVENTION

Accordingly, a primary object of the present invention is to provide a power generation system which can be quickly started and generate power on the order of megawatts, such as to meet peak electric demand of an electricity supply grid.

Another object of the present invention is to provide a power generation system which emits little or no regulated pollutants, such that citing of such a power plant in compliance with emissions regulations is simplified.

Another object of the present invention is to provide a power generation system which produces power itself and also synergistically enhances power output from a second adjacent power generation system, such as a gas turbine power cycle or other heat engine.

Another object of the present invention is to provide a power generation system which utilizes on-site storage of reactants and other necessary supplies to operate on the order of hours without requiring continuous reactant delivery.

Another object of the present invention is to provide a power generation system which can be built at a minimum of capital expenses and provide power on the order of megawatts in a fast starting low emissions fashion.

Another object of the present invention is to provide a power generation system which can operate without concern for availability of wind, sunlight or water storage in a reservoir, to meet peak electric demand, with little or not atmospheric emissions.

Other further objects of the present invention will become apparent from a careful reading of the included drawing figures, the claims and detailed description of the invention.

DESCRIPTION OF THE PREFERRED EMBODIMENT

Figure 1:
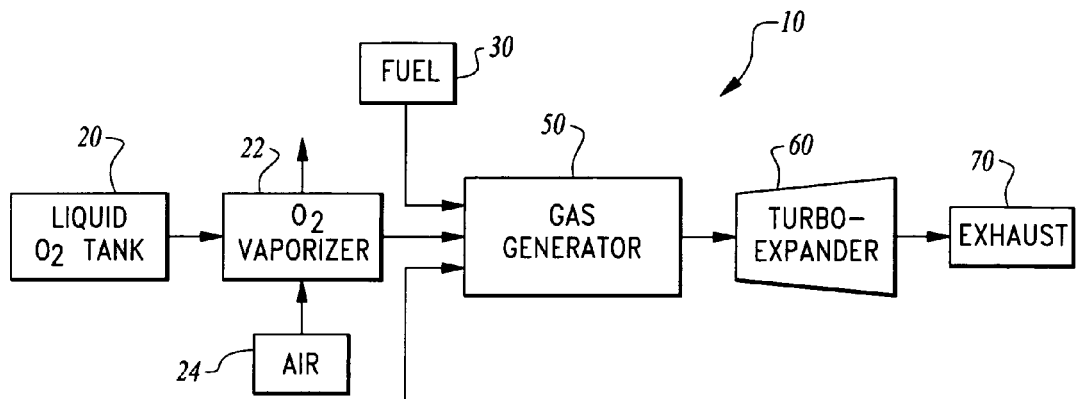
FIG. 1 is a power plant schematic of a baseline peaking power plant according to a preferred embodiment of this invention.

Referring to the drawings, wherein like reference numerals represent like parts throughout the various drawing figures, reference numeral 10 is directed to an ultra low emissions power generation system (FIG. 1). This system 10 is capable of relatively high power output (10-200 MW or more) in a configuration which facilitates fast starting suitable for peak power supply. The system 10 does not necessarily require separate continuous sources of fuel and oxygen, but rather preferably has consumables stored in tanks or other reservoirs ready for use and operation for periods on the order of hours, such as to meet peak demand of the electricity grid. Because the fuel is combusted with oxygen rather than air, oxides of nitrogen are minimally produced, such that the power generation system 10 can be sited in locations where emissions restrictions would otherwise deter or preclude additional power generation.

In essence, and with particular reference to FIG. 1, basic details of the power generation system are described. An oxygen source 20, such as a liquid oxygen tank stores oxidizer for the system. A fuel source 30, preferably containing a hydrocarbon fuel is also provided for on-site fuel storage. A diluent source 40 is provided, such as in the form of a de-ionized water tank or other reservoir with storage of sufficient de-ionized water for operation of the system for a predetermined amount of time. A gas generator 50 is provided which is adapted to combust fuel from the fuel source 30 with oxygen from the oxygen source 20, and in the presence of water as diluent from the diluent source 40, to produce high temperature high pressure products of combustion including steam and carbon dioxide.

These products of combustion are then routed to an expander 60, such as a turbine, before being delivered to an exhaust 70. The expander 60 is adapted to output power. In the simplest form of this invention, the exhaust 70 releases the products of combustion into the surrounding atmosphere, the products of combustion being only steam and carbon dioxide with trace amounts of other constituents. With the consumable items including fuel from the fuel source 30, oxygen from the oxygen source 20 and water from the diluent source 40, the system is ready to be started at any time and can operate as long as the supply of fuel, oxygen and water last. Tanks can be sized so that the system can operate for the length of time anticipated to meet the demands of the power user or associated electric power distribution system. Tank refill can occur during or after system 10 operation, potentially further increasing operating time.

Figure 2:
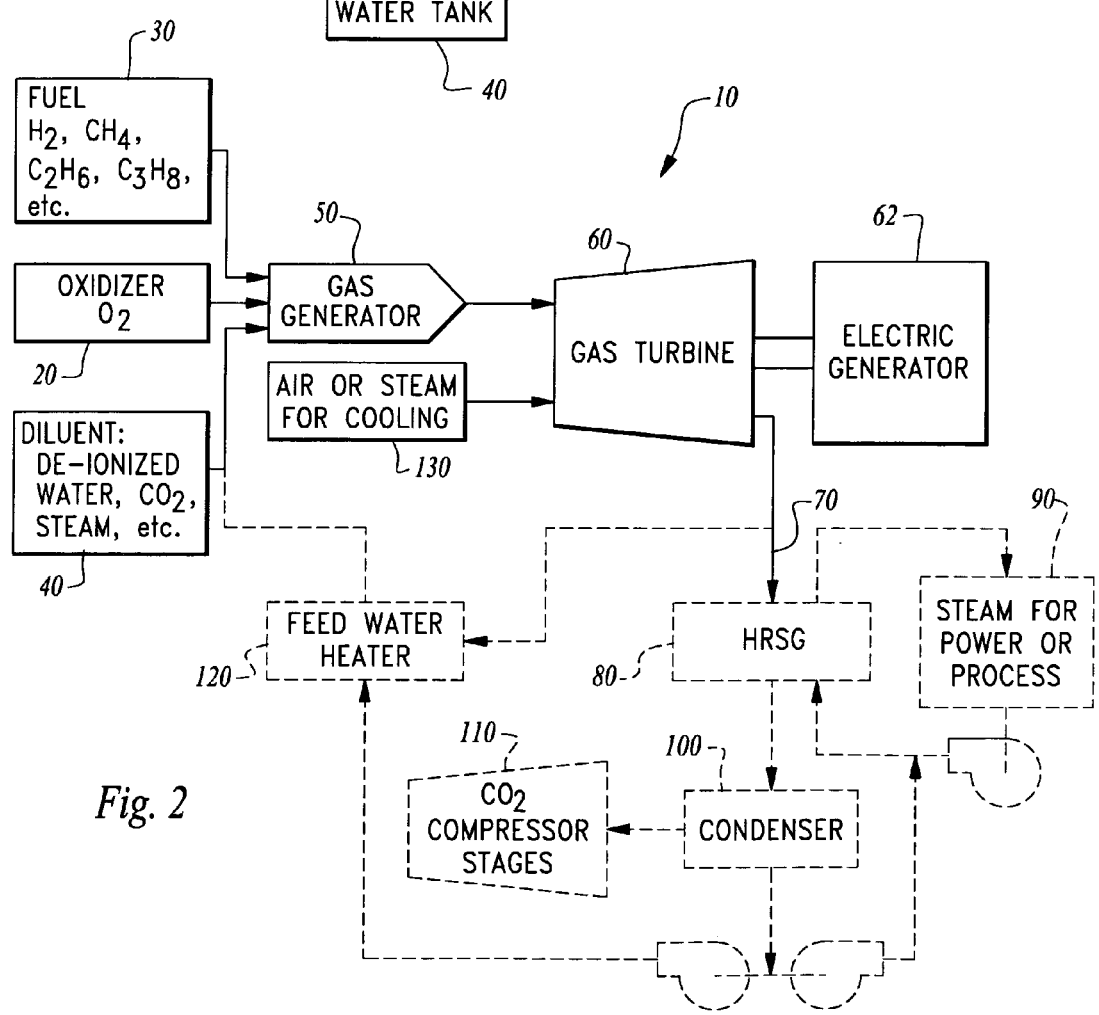
FIG. 2 is a schematic of the baseline power plant of FIG. 1 with various optional enhancements and subsystems included to illustrate variations usable with the baseline power plant of this invention.

More specifically, and with particular reference to FIG. 2, particular details of the peaking power generation system 10 are described according to the preferred embodiment. The oxygen source 20 is preferably a liquid oxygen tank having a size sufficient to supply oxygen for the period of time desired for operation of the overall system 10. By storing the oxygen in liquid form, a safer and larger volume supply of oxygen can be provided in a smaller space than would otherwise be required. As an alternative, an air separation unit could be located on-site or an oxygen pipeline could be routed to the location of the power generation system 10 with liquid oxygen supplied from a separate location. It is also conceivable in the case of an air separation unit or other oxygen supply system that the oxygen would be supplied already in gaseous form.

Most preferably, the oxygen is stored as liquid oxygen, but delivered to the gas generator 50 in gaseous form. Thus, an oxygen vaporizer 22 is preferably provided to change a phase of the oxygen from a liquid phase to a gaseous phase (FIG. 1). In a most preferred form of this invention, this vaporizer is in the form of a heat exchanger that simply routes ambient air past one side of the heat exchange surface while the liquid oxygen is routed past an opposite side of the heat exchange surface. Heat from the surrounding air heats up the liquid oxygen, allowing the liquid oxygen to gasify into a gas. Cooled air is discharged from the oxygen vaporizer.

Should the source of oxygen 20 be in the form of an air separation unit or a liquid oxygen pipeline, while no liquid oxygen tank might be provided, or a liquid oxygen tank might be provided in conjunction with such a continuous liquid oxygen supply, a liquid oxygen vaporizer 22 would still be utilized to perform the final vaporization step to convert the liquid oxygen to gaseous oxygen for utilization by the gas generator 50.

The fuel source 30 is also preferably a tank for storage of the fuel. The fuel is preferably a hydrocarbon fuel with hydrocarbon fuels generally described as fuels which contain either carbon or hydrogen, but typically both. Such hydrocarbon fuels thus include pure hydrogen, coke, carbon monoxide or other fuels which are composed of hydrogen without carbon or carbon without hydrogen. Such fuels containing either hydrogen or carbon are generally grouped within the general categorization of hydrocarbon fuels, with most such hydrocarbon fuels being fuels containing both carbon and hydrogen, such as methane, ethane, propane, ethanol, syngas, diesel (including biodiesel) etc. The fuel at the fuel source 30 is preferably a gaseous fuel at standard temperature and pressure which is maintained under sufficient pressure so that it can be stored in liquid form, such as natural gas. As an alternative, the fuel could be of a type which is a liquid at standard atmospheric pressure and temperature, such as ethanol or diesel. If the fuel is liquid, it would also typically be gasified, such as with a heater, before delivery into the gas generator 50. Alternatively, the fuel could enter the gas generator as a liquid.

The fuel at the fuel source 30 could also be a synthetic fuel (i.e. "syngas") created from a solid or liquid feed stock, with such synthetic fuel typically being primarily a mixture of hydrogen gas and carbon monoxide. Such synthetic fuel could be derived from coal, biomass, landfill gas, petcoke, or other solid or liquid starter fuels which through appropriate processes can be converted into gaseous hydrocarbon fuel suitable for combustion within the gas generator 50.

The diluent source 40 is preferably a tank or other reservoir containing deionized water. The gas generator 50 is configured to combust hydrocarbon fuel with oxygen with water present as a diluent to control temperature and increase mass flow from the gas generator 50. While the amount of diluent water delivered to the gas generator 50 can be varied depending on the temperature desired for production by the gas generator 50, preferably at least some water is supplied to the gas generator 50. By providing the water as de-ionized water, a minimum of fowling of water pathways within the gas generator 50 is provided. It is also conceivable in an alternative embodiment that in at least some cases the fuel could be combusted with oxygen with sufficiently high temperature called for that no water would be required or other diluent. Preferably, the diluent source 40 has a capacity which is sized to match a capacity of the source of fuel 30 and oxygen source 20, so that the gas generator 50 can operate without replenishing of the fuel source 30, oxygen source 20 or diluent source 40 for a desired period of time for operation of the peaking power generation system 10.

For instance, if it is contemplated that the system will never be required for more than four hours to meet peak demand of an electric power grid, such as when a large number of air conditioners are in operation during the highest temperature hours of the day, it might be determined that four hours of operation of the system 10 is a sufficient maximum amount. In which case, the oxygen source 20, fuel source 30 and diluent source 40 would be sized to store an amount of these consumables necessary to allow the overall system 10 to operate for four hours. During the other twenty hours of the day, the various reactants would be resupplied to the oxygen source 20, fuel source 30 and diluent source 40 so that the system 10 would again be charged and ready for operation on relatively short notice. In particular, it is desired that no more than thirty minutes, and preferably less, would be required to bring the system 10 online and up to full power for meeting the power generation needs of the user.

The gas generator 50 is generally in the form of an oxyfuel combustor which includes a fuel inlet coupled to the fuel source 30, an oxygen inlet coupled to the oxygen source 20 through a gaseous oxygen outlet of the vaporizer 22 (if the oxygen source 20 is a source of liquid oxygen), and preferably also a water inlet coupled to the diluent source 40. While the diluent source 40 is preferably water, it could also conceivably be carbon dioxide or some other diluent source. A preferred form of gas generator 50 is an oxyfuel combustor such as those described in U.S. Pat. Nos. 5,956,937; 6,206,684; and 6,247,316, each incorporated herein by reference. Variations on such a gas generator 50 have been placed in operation and are available from Clean Energy Systems, Inc. of Rancho Cordova, Calif.

The gas generator 50 combusts the fuel with the oxygen at a substantially stoichiometric ratio necessary for complete combustion of the fuel with the oxygen to produce substantially only steam and carbon dioxide. In the case where the fuel is pure hydrogen, the products of combustion would be steam only. In the case where the fuel is only carbon monoxide or other non-hydrogen containing fuels, the products of combustion could be substantially only carbon dioxide. In either case, pollutants such as oxides of nitrogen and other pollutants are minimized to trace amounts and significantly less than current best available control technology levels, such that regulatory issues associated with permitting of the power generation system 10 are kept at a minimum.

The expander 60 downstream from the gas generator 50 is most preferably in the form of a turbine. Most preferably, this turbine is an aero-derivative type turbine which studies have shown is capable of being driven by the mixture of steam and carbon dioxide likely comprising the products of combustion within the gas generator 50. The compressor associated with such an aero-derivative turbine would be removed and the compressor drive shaft optionally coupled to an electric generator for power output. This turbine or other expander 60 is coupled to an electric generator 62 for electricity generation and delivery to an electric power user, such as through the electric grid. If required, air or steam are provided from a cooling fluid source 130 to the air derivative turbine or other gas turbine to provide the required cooling for stators and veins within the gas turbine to maintain optimal performance of the turbine or other expander 60.

A discharge of the expander 60 is directed to an exhaust 70 which in a preferred form of the invention merely exhausts the products of combustion into the atmosphere to provide a most simplified form of the invention. As an alternative, the exhaust 70 can be further processed in various different ways. For instance, the exhaust 70 could be routed to a heat recovery steam generator 80 or other form of heat exchanger where heat can be used for various purposes. For instance, a steam system 90 can be coupled to the heat recovery steam generator 80 where steam is generated such as for use within a closed Rankine cycle power generation system to generate extra power for the overall system 10, or to generate process steam for delivery of steam for various other processes where heating or other steam uses are in demand.

Downstream from such a heat recovery steam generator 80, the products of combustion could be exhausted to the atmosphere or routed to a separator, such as in the form of a condenser 100. The condenser 100 merely cools the products of combustion sufficiently so that water within the products of combustion is condensed from gaseous phase steam into liquid phase water within the condenser, while carbon dioxide and other non-condensable gases remain gases within the condenser.

A liquid outlet from the condenser 100, containing primarily water, can then be routed back to the gas generator 50, either directly or through the diluent source 40. If desired, feed water heaters 120 can be provided to preheat this water before being routed back to the gas generator 50.

CO2 outputted from the condenser 100 can be processed within a CO2 compressor/disposal system 110 where the CO2 can be compressed for storage and later commercial use or for other sequestration away from the atmosphere, such as by pressurization and injection into an at least partially depleted oil well either for storage or for enhanced oil recovery, or the CO2 can be otherwise disposed of. In such an overall system, no atmospheric emissions are provided, further simplifying the permitting process for the power generation system 10. Appropriate pumps would be supplied within such an at least partially closed cycle to route the products of combustion and other flows where desired in accordance with the schematic particularly pictured in FIG. 2 or variations thereof selected by the power plant designer to optimize the particular needs of the user.

Figure 3:
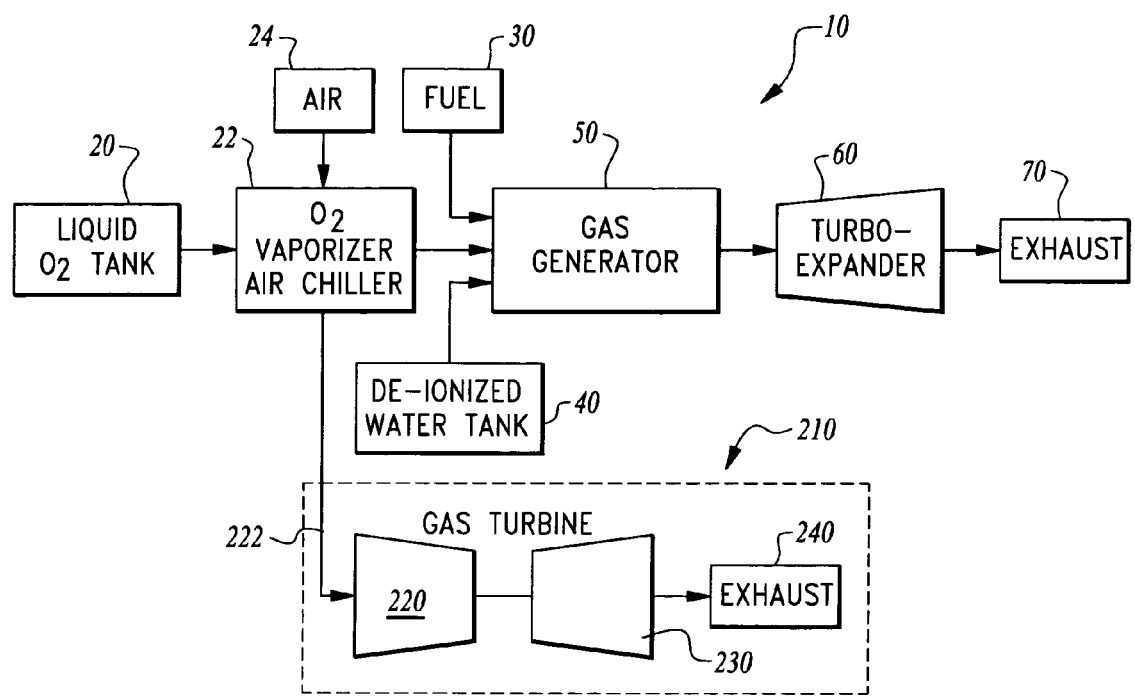
FIG. 3 is a schematic of a modified implementation of the baseline power plant of this invention where air utilized in the oxygen vaporizer is routed to a gas turbine or other second power generation system to enhance performance of the second power generation system.

In one particular enhanced embodiment of the power generation system 10, a second power generation system, such as a gas turbine system 210 or other heat engine has its performance beneficially enhanced (FIG. 3). In particular, power generation systems such as gas turbine power generation systems operate as an open Brayton cycle which is a general form of heat engine where efficiency and power output of such a system 210 is increased when a temperature change of a working fluid is maximized. In the case of a gas turbine 210, the working fluid is air, such that a temperature change experienced by the air is beneficially maximized to maximize performance of the gas turbine. Other heat engines including those operating on other cycles and generally referred to as heat engines also benefit from improved performance when temperature change for the working fluid is increased.

In the embodiment depicted in FIG. 3, the overall power generation system 10 remains the same as in FIG. 1 except that air routed through the vaporizer 22 from a source of air 24 is discharged from the vaporizer 22 in the form of chilled air routed along a chilled air input 222 into a compressor 220 of a gas turbine system 210 or other air inlet of some other heat engine. By providing chilled air into the gas turbine system 210 or other heat engine, the performance of the gas turbine is enhanced.

In particular, studies have shown that a nominal 40 MW gas turbine power generation system can have its performance altered from 34 MW of power generation to 41 MW of power generation by having an inlet air temperature modified from 80° F. to 40° F. In prior art proposed systems, some form of refrigeration unit would need to be supplied to cool the air upstream of the compressor 220 of the gas turbine system 210, before the air is used to combust the fuel and routed to the turbine 230 and then passed on to the exhaust 240. However, such a refrigeration unit has a significant capital expense and also would draw significant power away from the overall power generation system such that a system would typically not be practical.

In this case however, no such refrigeration unit is required. Rather, the heat of vaporization added to the liquid oxygen to transition the liquid oxygen into gaseous oxygen form is taken from the air so that the air is cooled to properly operate the peaking power generation system 10. This chilled air is not just discharged into the ambient atmosphere, but rather is beneficially utilized according to this alternative embodiment of FIG. 3 to enhance the efficiency of an adjacent gas turbine power generation system 210 or other heat engine based power generation system.

Typically, the peaking power generation system 10 of this invention would be sited adjacent an existing power plant where a power island and switch gear and other equipment associated with accessing the electricity grid are already in place. Also, the gas generator 10 takes up a relatively small footprint and the storage systems for the fuel source 30, oxygen source 20 and diluent source 40 are relatively small, such that the entire power generation system 10 could relatively conveniently be sited on excess space already available at many existing power plants including gas turbine system 210 containing power plants. Thus, existing gas turbine power plants can have their performance enhanced with the addition of the peaking power generation system 10, both by the power generated by the peaking power generation system 10 itself, as well as by increasing power output from the gas turbine system 210 associated with cooling the air entering the compressor 220 of the gas turbine system 210 in accordance with the alternative embodiment of this system as depicted in FIG. 3.

In one variation of the system 10 depicted in FIG. 3, the vaporizer 22 can include a heat exchange fluid to heat the oxygen and then use the heat exchange fluid to cool the air in chilled air input 222. Such a heat exchange fluid could be brine or some other low freezing point liquid to minimize the formation of ice in the system, and to allow for some flexibility in storage of low temperature heat exchange fluid for later use or to otherwise increase flexibility in operation of the system 10.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. When structures are identified as being "upstream" or "downstream," such arrangement can be directly adjacent or with intervening structures. Such coupling could be permanent or temporary and either in a rigid fashion or in a fashion which allows pivoting, sliding or other relative motion while still providing some form of attachment, unless specifically restricted.

What is claimed is:

1. A hydrocarbon combustion power plant featuring ultra low emissions and fast starting on demand, such as to meet peak electric power needs, the system comprising in combination:
- a source of oxygen;
- a source of hydrocarbon fuel;
- a de-ionized water reservoir;
- a gas generator coupled to said source of oxygen, said source of hydrocarbon fuel and said de-ionized water reservoir;
- said gas generator adapted to combust the oxygen from said source of oxygen with the fuel from said hydrocarbon fuel source in the presence of water from said de-ionized water source to produce high pressure, high temperature products of combustion;
- said gas generator having a discharge for the products of combustion;
- an expander downstream from said discharge, said expander adapted to extract energy from the products of combustion and output power;
- an exhaust downstream from said expander, said exhaust adapted to release at least a portion of the products of combustion into the atmosphere;
- wherein said source of oxygen is liquid oxygen with a liquid oxygen vaporizer between said source of oxygen and said gas generator, said vaporizer adapted to convert the liquid oxygen from said source of oxygen from a liquid phase to a gaseous phase before delivery of the oxygen to said gas generator;
- wherein said vaporizer includes a heat exchange fluid adjacent a heat exchange surface in contact with liquid oxygen from said source of oxygen, said vaporizer adapted to extract heat from said heat exchange fluid sufficient to convert the liquid oxygen from a liquid phase to a gaseous phase;
- wherein said heat exchange fluid is air, said power plant adapted to route the air from said vaporizer after having been cooled into a compressor of a gas turbine power cycle, such that a power output of said gas turbine power cycle is increased; and
- said gas turbine power cycle including said compressor having an inlet adapted to receive the heat transfer fluid from said vaporizer as at least a portion of air passing into said compressor, said gas turbine power cycle including a combustor adapted to combust a fuel with compressed air from said compressor, at least a portion of the compressed air being heat exchange fluid air from said vaporizer, and said gas turbine power cycle including a turbine driven by combustion products from said combustor, said turbine adapted to output power at a rate at least partially influenced by a temperature of air entering said compressor inlet.

2. The power plant of claim 1 wherein said hydrocarbon fuel includes natural gas.

3. The power plant of claim 1 wherein said hydrocarbon fuel at said source of hydrocarbon fuel is in a liquid form.

4. The power plant of claim 3 wherein said hydrocarbon fuel includes diesel.

5. The power plant of claim 3 wherein said hydrocarbon fuel includes ethanol.

6. The power plant of claim 1 wherein said hydrocarbon fuel is syngas.

7. The power plant of claim 1 wherein said hydrocarbon fuel includes hydrogen and carbon therein, and wherein said gas generator is adapted to produce products of combustion including water and CO2; and wherein a separator is located downstream from said expander, said separator adapted to separate at least a portion of water within said products of combustion from carbon dioxide within said products of combustion, said power plant adapted to recirculate said water to said gas generator.

8. The power plant of claim 7 wherein a CO2 sequestration system is located downstream from a CO2 outlet of said separator, such that at least a portion of said CO2 within said products of combustion is prevented from release into the atmosphere.

9. The power plant of claim 1 wherein a heat exchanger is interposed in heat transfer relationship with said products of combustion downstream from said expander, said heat exchanger adapted to generate steam with heat extracted from said products of combustion.

10. The power plant of claim 9 wherein said heat exchanger is adapted to generate steam for a closed Rankine cycle power generation system for enhanced power generation.

11. The power plant of claim 9 wherein said heat exchanger is adapted to generate steam for various steam or heat utilizing processes separate from said power plant.

12. The power plant of claim 1 wherein said source of oxygen includes an air separation unit.

13. The power plant of claim 12 wherein said air separation unit is a cryogenic air liquefier adapted to cool air sufficiently to cause at least a portion of the air to be liquefied.

14. The power plant of claim 1 wherein said source of oxygen includes at least one liquid oxygen tank with said oxygen stored therein in liquid form.

15. A hydrocarbon combustion power plant featuring ultra low emissions and fast starting on demand, such as to meet peak electric power needs, the system comprising in combination:
- a source of oxygen;
- a source of hydrocarbon fuel;
- a de-ionized water reservoir;
- a gas generator coupled to said source of oxygen, said source of hydrocarbon fuel and said de-ionized water reservoir;
- said gas generator adapted to combust the oxygen from said source of oxygen with the fuel from said hydrocarbon fuel source in the presence of water from said de-ionized water source to produce high pressure, high temperature products of combustion;
- said gas generator having a discharge for the products of combustion;
- an expander downstream from said discharge, said expander adapted to extract energy from the products of combustion and output power;
- an exhaust downstream from said expander, said exhaust adapted to release at least a portion of the products of combustion into the atmosphere;
- wherein said source of oxygen is liquid oxygen with a liquid oxygen vaporizer between said source of oxygen and said gas generator, said vaporizer adapted to convert the liquid oxygen from said source of oxygen from a liquid phase to a gaseous phase before delivery of the oxygen to said gas generator;
- wherein said vaporizer includes a heat exchange fluid adjacent a heat exchange surface in contact with liquid oxygen from said source of oxygen, said vaporizer adapted to extract heat from said heat exchange fluid sufficient to convert the liquid oxygen from a liquid phase to a gaseous phase;
- wherein said heat exchange fluid is adapted to absorb heat from air upstream from an air inlet of a compressor of a gas turbine power cycle, such that a power output of said gas turbine power cycle is increased; and said gas turbine power cycle including a combustor adapted to combust a fuel with compressed air from said compressor, at least a portion of the compressed air having been cooled by said vaporizer, and said gas turbine power cycle including a turbine driven by combustion products from said combustor, said turbine adapted to output power at a rate at least partially influenced by a temperature of air entering said compressor inlet.

* * * * *